July 28, 1953  E. D. TILLYER ET AL  2,646,627
THICKNESS GAUGE FOR LENSES
Filed Dec. 16, 1948  2 Sheets-Sheet 1

INVENTOR.
EDGAR D. TILLYER
JOSEPH ROBERT EVES
BY
Louis L. Gagnon
ATTORNEY

July 28, 1953     E. D. TILLYER ET AL     2,646,627
THICKNESS GAUGE FOR LENSES
Filed Dec. 16, 1948     2 Sheets-Sheet 2

INVENTOR.
EDGAR D. TILLYER
JOSEPH ROBERT EVES
BY
Louis L. Chapman
ATTORNEY

Patented July 28, 1953

2,646,627

UNITED STATES PATENT OFFICE 2,646,627

THICKNESS GAUGE FOR LENSES

Edgar D. Tillyer and Joseph Robert Eves, Southbridge, Mass., assignors to American Optical Company, Southbridge, Mass., a voluntary association of Massachusetts Application December 16, 1948, Serial No. 65,686

2 Claims. (Cl. 33—143)

This invention relates to gauges and has particular reference to gauges used for measuring the mean thickness of articles such as ophthalmic lenses and method of using same.

The principal object of the invention is to provide a gauge for measuring the mean thickness of articles such as ophthalmic lenses along a given circular path surrounding the optical center of the articles irrespective of the surface curvatures thereof by contacting said curved surfaces at spaced points along said circular path.

Another object is to provide a gauge of the above character either in the form of a dial indicator or caliper type and which directly enables the obtaining of the desired mean thickness measurement.

Another object is to provide a gauge of the above character embodying an arm and a member movable toward and away from the arm, means immovably carried by the arm for engaging one side surface of the lens to be gauged, and means swively mounted on the movable member for engaging the opposed side surface of the lens, the means on the movable member embodying a universally floating portion having three spaced contacts thereon for providing a three point engagement with the lens surface, the swivel mounting therefor permitting all three contacts to be firmly seated on the lens surface, with indicating means being associated with the gauge for visually indicating the mean thickness of the lens along a circular path surrounding the center of the lens.

Another object is to provide a device of the above character which is simple in its construction, efficient in its operation and comparatively economical to manufacture.

Other objects and advantages of the invention will become apparent from the following description taken in connection with the accompanying drawings in which.

Figure 1:
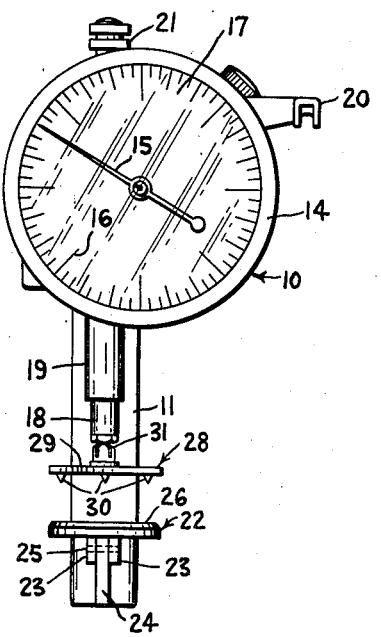
Fig. 1 is a front elevational view of a dial indicator gauge embodying the invention.
Figure 2:
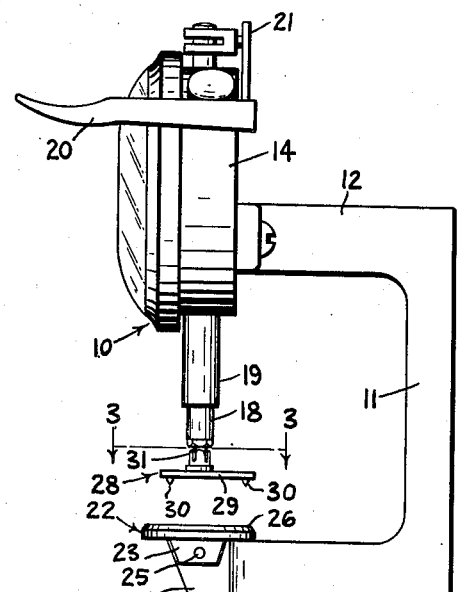
Fig. 2 is a side elevational view of the same.

It has been found in the art of hardening articles such as ophthalmic lenses, in order to determine with some degree of accuracy the temperatures required, that the thickness of the article to be hardened must be subsequently determined prior to the hardening process by methods sometimes involving complicated computations, especially when the lenses are of types having unequal surface curvatures in the two major meridians of the lens.

These thickness determinations are, however, governed largely by the nature of the hardening methods employed. With the present invention, wherein the article to be hardened is first heated to a controlled temperature and is then subsequently hardened by suddenly subjecting the article to a coolant which is directed primarily to the central area of the heated article whereby the hardness of the article results from having the inside in tension and the outer surfaces in compression, it has been found that if the mean thickness of the article along the circular path, which is the area which receives the coolant, is determined, and the heat treatment is thereafter controlled according to said mean thickness, a relatively positive means is provided for obtaining substantially uniform results. The articles to be hardened in accordance with the present invention are formed of glass and may possess various different combinations of surface curvatures on the opposed sides thereof. While such articles possess different diameters it has been found, with the above method of hardening, that by obtaining the mean thickness of the article at given points along a circular path surrounding the central area of the article the temperatures required for articles having different mean thicknesses may be charted and followed according to the mean thickness determinations. The present invention, therefore, is directed particularly to the provision of devices for determining the mean thickness along a selected circular path at a given distance from the optical center of the article, and embodies means for simply and efficiently obtaining this measurement of a lens directly from the lens by use of a swively mounted device adapted to contact a side surface of a lens and to engage three points along a circular path surrounding the optical center of the lens.

The lens is supported on the opposite side by a fixed ring-like device engaging the side surface along the circular path. An indicating device cooperatively functions with the contacting device and lens supporting device to register the spacing between said devices as controlled by the thickness of the lens at the points of engagement.

Referring to the drawings, Figs. 1-5 illustrate a gauge 10 of the conventional dial indicator type embodying a base 11 having spaced parallel arms 12 and 13 extending from the ends thereof. The arm 12 has secured thereto by suitable means a conventional dial indicating device 14 provided with a rotatable indicator 15 adapted to register with indicia 16 provided on the dial face 17 and operated through conventional mechanism (not shown) by a longitudinally movable operating member 18 extending through the indicating device 14 and having its lower end extending in a direction toward the end of the arm 13 on the base 11, the member 18 being slidable in a sleeve 19 extending downwardly from the device 14. A manually operable lever 20 is connected through suitable linkage 21 to the upper end of the operating member 18 and serves, when depressed, to move the member 18 upwardly away from the arm 13, with spring means located within the device 14 serving to constantly urge the member 18 downwardly toward the arm 13.

The end of the arm 13 carries a disc-like lens supporting member 22 having a pair of spaced downwardly extending connecting members 23 formed on its lower surface, which members 23 are adapted to be positioned on opposite sides of a substantially thin attachment portion 24 formed on the end of the arm 13, with means such as a pin 25 being used to immovably secure the connecting members 23 to the portion 24. The supporting member 22 is provided with a recessed upper surface so as to provide an annular rim which projects to and terminates in a single plane, said rim being bevelled throughout its outer peripheral edge so as to form a substantial knife-edge ring 26 in said plane on which is positioned a lens 27 or other article to be measured (Fig. 4) and with which it will have sharp contact. Since most lenses such as are used in ophthalmic mountings are provided with at least one spherical surface, it is desirable to place the spherical side of the lens against the ring 26 to insure continuous engagement between the lens and ring throughout the entire contour of the ring. It is important to note here that the ring 26 defines a circular path located in a single plane surrounding the optical center of the lens and along which three points will be selected, as described hereinafter, for determining the mean thickness of the lens along this path.

The operating member 18 carries at its lower end a contact device 28 embodying three equiangularly spaced radially extending arms 29 each of which is provided equidistant from the vertical axis of the device with a downwardly extending pin-point contact 30, which contacts 30 are adapted to align with the knife-edge ring 26 when the device is in normal inoperative position whereby the indicating device 14 will register zero. The contact device 28 is swivelly connected to the end of the operating member 18 by a conventional ball and socket connection, the contact device 28 being preferably provided with a socket member 31 which is adapted to receive a ball member 32 (Fig. 4) formed on the end of a stud 33 threadedly or otherwise inserted in the lower end of the member 18. This swivel connection permits the contact device 28 to be self-aligning so that the contacts 30 will align themselves with the ring 26 or seat themselves on the surface of a lens 27 carried by the supporting member 22. In seating themselves on a lens surface, the contacts 30 will all automatically engage the lens surface at spaced points along the path defined by the ring 26. However, it will be understood that when the contacts 30 engage a surface having different meridional curvatures the device 28 will be tilted. This tilting movement will cause the contacts to be offset somewhat with respect to the path defined by the ring 26. However, such offset is compensated for by vertical movement of the operating member 18 so that the resultant indication registered by the indicating device will show the mean thickness of the lens along the said path, which indication will be within tolerances allowed for this operation.

Figure 4:
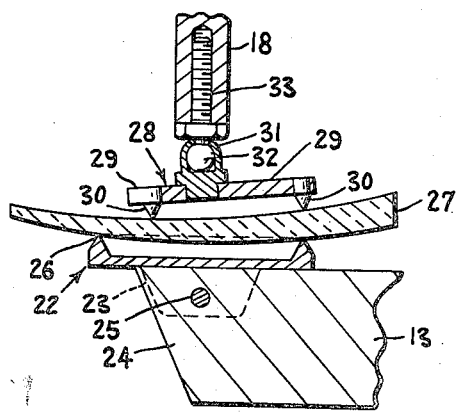
Fig. 4 is a fragmentary sectional side view illustrating the relationship of the parts of the device when measuring one type of lens.
Figure 3:
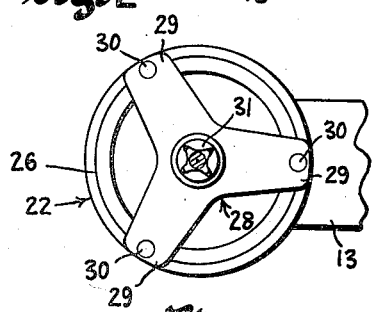
Fig. 3 is a fragmentary sectional view taken on line 3—3 of Fig. 2 and looking in the direction of the arrows.
Figure 5:
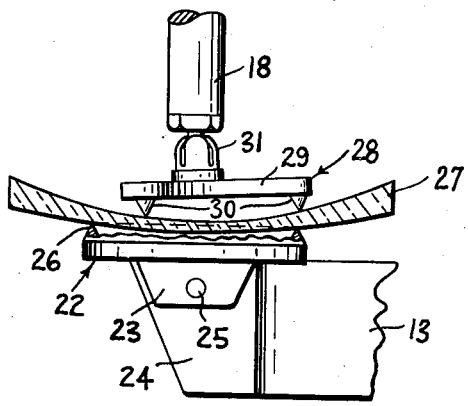
Fig. 5 is a fragmentary side elevational view illustrating the relationship of the parts when measuring the mean thickness of a different type of lens.
Figure 7:
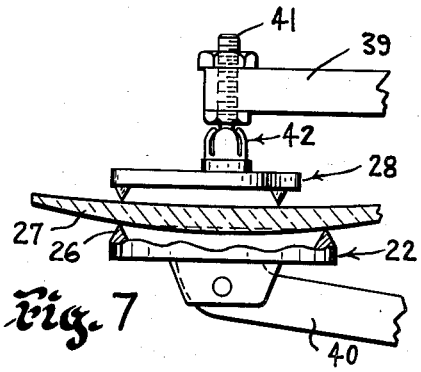
Fig. 7 is a fragmentary side elevational view illustrating the relationship of the parts of a caliper type gauge when measuring the thickness of a lens.

In using the device, the indicating device is initially set at zero, which indication is obtained when the device is normally inoperative with the contacts 30 all aligned with the knife-edge ring 26 of the supporting member 22. Then by depressing the lever 20 the operating member 18 can be raised to disengage the contacts 30 from the ring 26 to permit a lens 27 or other article to be inserted between the contact device 28 and supporting member 22. The lens 27 is positioned on the member 22 so that it is supported approximately at its center and located with its spherical surface in engagement with the ring 26 (Figs. 4-5-7). The lever 20 is then released and the member 18 permitted to move downwardly whereupon the contact device 22 will move toward the lens until the contacts 30 engage the upper surface thereof. The contacts 30 will all engage the lens surface by virtue of the swivel connection 31—32 regardless of the meridional curvatures of the surface and the resultant indication registered by the indicating device will show the mean thickness of the lens along the circular path as obtained directly from the lens.

It will be understood that all three contacts are necessary since with two contact points true indications will not result since two points establish a line and curves in both major meridians of the lens will not be taken into consideration, and a single point of contact will indicate the thickness of the lens at this one point only. The use of more than three contact points is not practical for obtaining true indications of the mean thickness of lenses of all varying surface curvatures along a circular path as described above since additional points will not always seat themselves on surfaces having various curvatures.

A caliper type gauge can be used rather than the indicator type if desired, the caliper type gauge embodying a pair of spaced arms 33 and 34 which are hinged at 35 for movement toward one another. One end of the arm 33 is provided with an arcuate graduated indicating plate 36 with the adjacent end of the arm 34 being provided with means embodying a graduated inclined edge portion 37 for the graduations 38 on the plate 36 as the arms 33 and 34 are moved. The opposed end portions 39 and 40 of the arms 33 and 34 respectively carry the contact device 28 and supporting member 22. The contact device 28 is swivelly connected to the end of a stud 41 vertically disposed near the end of the portion 39 by a ball and socket connection 42 while the supporting member 22 is connected to the arm 40 similarly to the connection between the member 22 and arm 13 in the dial gauge.

Thus, upon causing the arms 33 and 34 to move toward one another the contact device 28 and supporting member 22 can be separated to permit a lens to be inserted therebetween with spring means (not shown) cooperating with the hinge connection 35 to cause the device 28 to contact the surface of the lens upon release of pressure upon the arms 33 and 34, and the mean thickness of the lens along the path defined by the ring 26 of the supporting member 22 may then be read upon the plate 36 in accordance with the position of the graduated inclined edge portion 37 with relation to the indicia 38.

Figure 9:
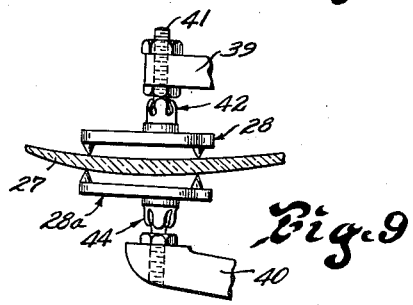
Figs. 8 and 9 are views generally similar to Figs. 5 and 7 respectively and showing further modification.
Figure 6:
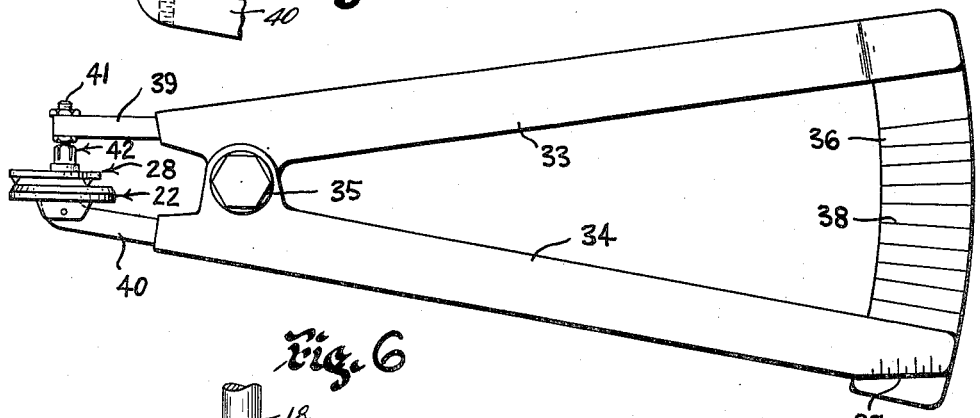
Fig. 6 is a side elevational view of a caliper type gauge embodying the invention.
Figure 8:
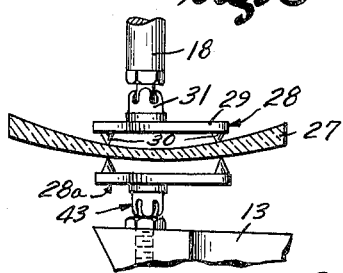

It will be understood that although the foregoing description refers particularly to measuring a lens having one spherical surface, the device can be used to measure lenses having both side surfaces formed with different curves in the major meridians. To measure the latter type of lens it is merely necessary to remove the disc-like lens supporting member 22 from the arm 13 or 34 and substitute in its place a second swivelly mounted contact device 28a which in structure is similar to the contact device 28. Fig. 8 shows an arrangement where contact device 28a has been swivelly mounted by a ball and socket connection 43 to arm 13 and Fig. 9 shows an arrangement where the contact device 28a has been swivelly mounted by a ball and socket connection 44 to arm 40. This will provide a three-point contact on both side surfaces of the lens and will result in the indication of the desired mean thickness measurement of such a lens.

By constructing gauges according to the foregoing description the mean thickness of articles such as lenses along given circular paths can be obtained directly from the lens by a simple measurement thereof without involving elaborate mechanisms or computations.

While certain novel features of the invention have been shown and described and are pointed out in the annexed claims, it will be understood that many various omissions, substitutions and changes in the formation and details of the device illustrated and in its operation may be made by those skilled in the art without departing from the spirit of the invention.

We claim:

1. A measuring device for determining the mean thickness of a lens formed of relatively hard transparent material at a given distance from the center thereof, said device comprising a pair of arms mounted for relative movement toward and away from each other, a relatively rigid supporting member secured to one of said arms and having effectively sharp contacting means projecting to and terminating in a plane, said means lying along a circular path in said plane and defined by a radius equal to approximately the distance from the center of the lens at which its mean thickness is to be determined, and a contact member secured to the other arm by a universal connection whose center lies along a line drawn through the center of and approximately normal to the plane in which the said sharp contacting means carried by the first arm terminates, said contact member having three substantially non-yielding pin point contacts extending in the direction of said sharp contacting means and spaced equidistantly from each other and from the center of said universal connection for engaging the opposed surface of the lens to be measured, the ends of said pin point contacts lying in substantially the same plane and at a distance from said center line equal to approximately the radius of said circular path, and indicating means operable in response to movement of said arms relative to each other whereby a lens of non-uniform thickness at said distance from the center thereof may be positioned between the sharp contacting means and spaced pin point contacts with its center along said center line and the projecting means and spaced pin point contacts brought into engagement with the opposed surfaces of the lens to obtain an indication of the mean thickness of said lens at said given distance from the center thereof.

2. A measuring device for determining the mean thickness of a lens formed of relatively hard transparent material at a given distance from the center thereof, said device comprising a pair of arms mounted for relative movement toward and away from each other, a relatively rigid supporting member secured to one of said arms and having an annular beveled projecting rim presenting a substantially non-yielding knife edge ring for engaging one surface of the lens to be measured, said knife edge ring lying within substantially a single plane and being defined by a radius equal to approximately the distance from the center of the lens at which its mean thickness is to be determined, and a contact member secured to the other arm by a universal connection whose center lies along a line drawn through the center of and approximately normal to the plane in which the said knife edge ring carried by the first arm lies, said contact member having three downwardly extending substantially non-yielding pin point contacts spaced equidistantly from each other and from the center of said universal connection for engaging the opposed surface of the lens to be measured, the ends of said pin point contacts lying in substantially the same plane and at a distance from said center line equal to approximately the radius of said knife edge ring, and indicating means operable in response to movement of said arms relative to each other whereby a lens of non-uniform thickness at said distance from the center thereof may be positioned between the knife edge ring and spaced pin point contacts with its center along said center line and the knife edge ring and spaced pin point contacts brought into engagement with the opposed surfaces of the lens to obtain an indication of the mean thickness of said lens at said given distance from the center thereof.

EDGAR D. TILLYER.
JOSEPH ROBERT EVES.

References Cited in the file of this patent

UNITED STATES PATENTS

| Number | Name | Date |
|---|---|---|
| 1,093,307 | Becker | Apr. 14, 1914 |
| 1,187,034 | Bugbee | June 13, 1916 |
| 1,521,117 | Miller | Dec. 30, 1924 |
| 2,220,040 | Hathaway et al. | Oct. 29, 1940 |
| 2,383,742 | Russell | Aug. 28, 1945 |
| 2,445,875 | Emery | July 27, 1948 |
| 2,448,314 | Kavanagh | Aug. 31, 1948 |
| 2,521,883 | Teevin | Sept. 12, 1950 |

FOREIGN PATENTS

| Number | Country | Date |
|---|---|---|
| 320,234 | Germany | Apr. 16, 1920 |